2,860,145

Patented Nov. 11, 1958

2,860,145

PREPARATION OF DICHLOROMALEIC ACID AND DICHLOROMALEIC ANHYDRIDE

George B. Kelly, Jr., and Charles H. Braithwaite, Jr., South Charleston, W. Va., and Dwight Williams, Needham Heights, Mass., assignors to Food Machinery and Chemical Corporation, New York, N. Y., a corporation of Delaware No Drawing. Application June 2, 1955
Serial No. 512,864

16 Claims. (Cl. 260—346.8)

This invention relates to an improved process for the production of dichloromaleic acid and dichloromaleic anhydride. This process permits for the first time the rapid, economical and convenient production of these compounds on a commercial scale.

Dichloromaleic acid and dichloromaleic anhydride have heretofore been prepared on a laboratory scale from a variety of starting materials. Among the earliest of these methods is one wherein dichloromaleic acid is prepared by oxidizing mucochloric acid (Salmony and Simonis, Berichte 38, 2588 (1905)) with fuming nitric acid. Although excellent yields are reported, the method requires that the mucochloric acid stand for a period of a week at room temperature, in the presence of a large excess of fuming nitric acid.

This early method is undoubtedly satisfactory for the preparation of small-scale laboratory batches of dichloromaleic acid, but it is much too slow for economical commercial operation. In addition to the handicap of the prolonged reaction time, the method also requires that large excesses of fuming nitric acid be used. This is not only uneconomical and necessitates special precautions in handling, but also requires the use of special non-corrosive equipment and presents additional problems in the recovery of a pure product.

The product of the reaction as carried out by this early method is dichloromaleic acid, obtained as a slurry in concentrated nitric acid. This slurry is extremely corrosive and would present a difficult engineering problem in its handling on a large scale. Only special materials of construction such as porcelain, stoneware or glass would be suitable for handling such a slurry, as even the noble metals and high-alloy stainless steels are attacked by nitric acid solutions containing chlorides. Nor would the slurry be separable in the usual commercial equipment, such as a centrifuge, plate and frame filter or rotary filter, due to the high rate of corrosion of the materials of which they are made. Although it might be separated on a large, Büchner-type stoneware or porcelain filter, this method is impractical on a large scale. Even after separating the slurry, the problem would remain of drying the product, which still would contain some nitric acid. The high solubility of the product in water would cause serious losses if it were attempted to wash out the nitric acid with water, and equipment for drying the product containing residual nitric acid would present the same materials-of-construction problem encountered in the separation of the slurry.

An object of this invention, therefore, is to provide an improved and commercially feasible process for the production of dichloromaleic acid and anhydride.

Another object is to produce dichloromaleic acid and anhydride by the rapid and economical oxidation of mucochloric acid.

Another object is to provide a process for the oxidation of mucochloric acid with diluted nitric acid at elevated temperatures.

Still another object is to provide a process for the direct production of dichloromaleic anhydride without separating dichloromaleic acid as an intermediate.

These and other objects, and attendant advantages, will become apparent in the subsequent description and detailed embodiments of the invention, and will be particularly pointed out in the appended claims.

Although the oxidation reaction of mucochloric acid with fuming nitric acid cannot in practice be accelerated by heating the reaction mix, due to the violent and uncontrollable reaction which frequently ensues, it has been discovered that dilute nitric acid does not tend to react explosively with mucochloric acid. It has often been observed that dilute nitric acid and concentrated nitric acid may not be used interchangeably in chemical reactions, and that in cases when they do react to give the same product, a substantial excess of the dilute nitric acid is necessary. It has been discovered that a controlled yet rapid oxidation of mucochloric acid may be effected using equimolar amounts or only a slight excess of diluted nitric acid at elevated temperatures. The fact that, although dilute rather than fuming nitric acid is used, a large excess of reagent is not necessary, contributes to the economy of the process.

It was an unexpected discovery that the high yields of this reaction can be maintained even when no excess of diluted nitric acid is employed, in sharp contrast to the supposition of early workers in this field that a large excess of fuming nitric acid was necessary. In effect, by the present invention, a commercially feasible process is achieved for the first time.

In addition, equipment requirements are sharply reduced and, as a feature of the invention, both the oxidation process and the separation step may be carried out in a single piece of commercial equipment, such as a glass-lined kettle.

The present process has also eliminated the requirement that the mucochloric acid used be dry, as was necessary when the oxidizing agent was fuming nitric acid. The use of dilute nitric acid permits the use of wet mucochloric acid, as press or filter cake, thereby eliminating a unit operation from the actual overall process, wherein the mucochloric acid is an intermediate, usually prepared from furfural.

The reaction product may be obtained as either dichloromaleic acid or dichloromaleic anhydride. Often the anhydride is the form desired. The anhydride is not corrosive, and can be treated and stored in standard equipment. The acid, on the other hand, is corrosive to metals, especially in the presence of water, and presents a material-of-construction problem in storage and handling. In prior processes, as described above, it was necessary to isolate and purify the product in the form of dichloromaleic acid, and in a subsequent step to dehydrate the acid to the anhydride. In the process of this invention, the anhydride may be obtained directly, in pure form and excellent yield, by removing the nitric acid and water from the reaction mix.

The practice of the invention is illustrated by the following examples, wherein parts are by weight unless otherwise indicated.

Example 1

A preferred procedure is as follows: A 100-gallon jacketed glass-lined reactor is charged with 552 pounds of mucochloric acid and 176 pounds of a 23.4% solution of nitric acid in water. The mixture is heated to about 95° C. by application of steam to the reactor jacket, to initiate the reaction. The reaction is controlled at a moderate rate by the incremental addition of 235 pounds of 70% nitric acid over a period of about 3 hours, keeping the temperature at 80° C.

to 100° C., making a total of one mole of nitric acid added per mole of mucochloric acid. The evolved vapors are passed through a reflux condenser cooled with brine at −20° C., to condense and return the nitric acid and nitrogen dioxide vapors to the reactor while permitting the nitric oxide vapors to escape. When the addition of nitric acid is complete, reflux is continued for another 2 hours to ensure complete reaction. The water and excess nitric acid are distilled off, partly under atmospheric pressure, and, toward the end, under vacuum to maintain the pot temperature below 150° C. as rapid darkening is noted at higher temperatures. A rectification column equivalent to a column of 6 to 10 theoretical plates is used to minimize the loss of product to the distillate. The last fraction of the distillate usually contains a small amount of product which is recycled to the next batch. The distillation may be run continuously. The product, which remains in the reactor in molten form, is recovered in solid form by casting or flaking. The product is a white to pale yellow solid melting at 116–120° C. and assays 95% dichloromaleic anhydride. The yield is 89% of the theoretical yield.

*Example 2*

A flask equipped with a thermowell, an addition funnel and brine-cooled reflux condenser is charged with 2500 parts of mucochloric acid and 531 parts of water. The addition funnel is charged with 1331 parts of 70% nitric acid. About one third of the nitric acid solution is added to the mixture of mucochloric acid and water, forming about a 32% solution of nitric acid, and the flask is heated to about 90% C. to initiate the reaction. When the reaction has started, the temperature is maintained at about 85–100° C. during gradual addition of the nitric acid, and for about one hour after addition is complete, usually a total of 4–5 hours. The brine cooled condenser is then warmed to 20–30° C. to permit the oxides of nitrogen to escape. The water and excess nitric acid are distilled off as in Example 1, and the product dichloromaleic anhydride remains in the flask. Distillation of this product, which boils at 130° C. at 100 mm. of mercury, yields pure colorless dichloromaleic anhydride, melting at 120° C.

*Example 3*

Twelve hundred parts of mucochloric acid was mixed with 400 parts of fuming (about 90%) nitric acid, a nitric acid to mucochloric acid molar ratio of about 0.74, and heated to 90–100° C. in the apparatus described in Example 2. After about 20 minutes at this temperature, the reaction suddenly became violent, blowing out the condenser and thermowell from the reaction flask and ejecting the contents of the flask at high velocity. It thus appears that the use of concentrated nitric acid for this reaction is dangerous when the reaction mixture is heated.

*Example 4*

One hundred sixty-nine parts of mucochloric acid was mixed with 126 parts of 50% nitric acid and refluxed for 5 hours in the apparatus described in Example 2. Reaction started immediately. When reaction was complete, excess water and nitric acid were distilled off until a pot temperature of 149° C. was reached. The last portions of water and nitric acid were distilled off under an absolute pressure of 100 mm. of mercury. The molten dichloromaleic anhydride remaining in the still pot was cast to form a solid product melting at 115–118° C. The yield of 141.8 parts was equivalent to 85% of the theoretical yield.

When this experiment was repeated using an equivalent amount of nitric acid of 10% strength, there was no evidence of initiation of reaction after refluxing for 1 hour.

In practicing this invention, the temperature at which the reaction is carried out should be high enough to complete the reaction within a reasonable time. Temperatures within the approximate range of 80–105° C. are preferred, and under these conditions the reaction is completed in from about 2 to 5 hours.

It has been discovered that the practice of returning the evolved nitrogen dioxide to the reaction mixture, rather than venting it from the system, reduces by at least one half the amount of nitric acid required for the oxidation, since the nitrogen dioxide reacts further as an oxidizing agent.

The mixture should be sufficiently dilute to keep the reactants in solution and to avoid violent reactions at elevated temperatures. It is preferred to operate at a nitric acid dilution in the range of 20–50%. Assuming recycling of evolved nitrogen dioxide, a reactant ratio of about 0.7–1 mole of nitric acid per mole of mucochloric acid is preferred. This reactant ratio is in a range for practical operation. The theoretical ratio for complete reaction is 0.66 mole of nitric acid per mole of mucochloric acid. By avoiding a large excess of nitric acid, larger batches can be run, thereby enhancing the commercial feasibility. With acid concentrations higher than about 70%, irregular violent reactions may occur. With acid of less than about 20% strength, the reaction proceeds too slowly for economical operation.

The residual water and nitric acid can be separated entirely by distillation from the dichloromaleic acid formed in the process of this invention, leaving the product in the still pot as dichloromaleic anhydride of 90–95% purity. It has been found that a pot distillation temperature of 135–150° C. removes most of the nitric acid without darkening the product, while temperatures above 150° C. cause some darkening. It is preferred to distill to a temperature of about 145° C. at atmospheric pressure, removing any remaining nitric acid and water under reduced pressure, and maintaining the pot temperature below 150° C. Under these conditions the nitric acid content of the product is reduced to 0.06% or less, and a very light-colored product is obtained. If desired, a simple redistillation produces a colorless product of very high purity, assaying at 99.8+% dichloromaleic anhydride.

Although it is possible to stop the distillation at the point where the pot residue is virtually all dichloromaleic acid, it is generally preferred to produce the dichloromaleic anhydride first. Dichloromaleic acid of high quality is readily formed by adding the calculated amount of water to the anhydride.

An alternate method of removing the excess nitric acid consists in the addition of some readily oxidized substance that reacts with nitric acid to form volatile reaction products. Formic acid is an example of such a substance, although a large number of organic compounds could be used. Formic acid reacts readily with nitric acid to form water, oxides of nitrogen, and carbon dioxide, all of which are volatile at 120° C., (the melting point of the dichloromaleic acid or anhydride), at which temperature any excess formic acid is also volatilized, leaving substantially pure dichloromaleic anhydride or acid.

The present invention provides a highly advantageous and economical method for the preparation of dichloromaleic anhydride and dichloromaleic acid, which compounds have a variety of interesting uses, such as: curing agents for epoxy resins, adducts with unsaturated oils, constituents of alkyd resins, components of heteropolymers, modifiers in polyesters, chemical intermediates, etc. Novel products have thus been obtained, whose commercialization has depended on the availability of the dichloromaleic derivatives made possible by our invention.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. A method of producing dichloromaleic acid which comprises reacting mucochloric acid with aqueous nitric acid containing about 20–70% nitric acid, at a temperature of about 80–105° C., and separating water and unreacted nitric acid from the product.

2. The method of claim 1, wherein the proportion of nitric acid to mucochloric acid is between about 0.7–1.8 moles of nitric acid per mole of mucochloric acid.

3. The method of claim 1, wherein the proportion of nitric acid to mucochloric acid is between about 0.7–1.0 mole of nitric acid per mole of mucochloric acid.

4. A method of producing dichloromaleic acid, which comprises reacting mucochloric acid with aqueous nitric acid in the proportion of about 0.7–1.0 mole of 20–50% nitric acid per mole of mucochloric acid, at a temperature of about 80–105° C., for about 2–5 hours, recycling evolved oxides of nitrogen, and separating water and unreacted nitric acid from the product.

5. The method of claim 1, wherein unreacted nitric acid is separated from the product by reducing the nitric acid to volatile products with a low-boiling readily-oxidizable organic compound, and distilling off said low-boiling organic compound and volatile products.

6. A method of producing dichloromaleic acid, which comprises reacting mucochloric acid with aqueous nitric acid containing about 20–70% nitric acid, at a temperature of about 80–105° C., recycling evolved oxides of nitrogen, and separating unreacted nitric acid and excess water from the product.

7. A method of producing dichloromaleic anhydride, which comprises producing dichloromaleic acid by reacting mucochloric acid with aqueous nitric acid containing about 20–70% nitric acid, at a temperature of about 80–105° C., recycling evolved oxides of nitrogen, separating all the water and unreacted nitric acid from the dichloromaleic acid, and dehydrating the dichloromaleic acid to dichloromaleic anhydride.

8. A method of producing dichloromaleic anhydride, which comprises forming dichloromaleic acid by reacting mucochloric acid with aqueous nitric acid containing about 20–70% nitric acid, at a temperature of about 80–105° C., separating all the water and unreacted nitric acid from the dichloromaleic acid, and dehydrating the dichloromaleic acid to form dichloromaleic anhydride.

9. The method of claim 8, wherein the proportion of nitric acid to mucochloric acid is about 0.7–1.8 moles of nitric acid per mole of mucochloric acid.

10. The method of claim 8, wherein the proportion of nitric acid to mucochloric acid is about 0.7–1.0 mole of nitric acid per mole of mucochloric acid.

11. The method of claim 8, wherein unreacted nitric acid is separated by reducing the nitric acid to volatile products with a low boiling readily oxidizable organic compound, and distilling off said low boiling organic compound and volatile products.

12. A method of producing dichloromaleic anhydride, which comprises forming dichloromaleic acid by reacting mucochloric acid with aqueous nitric acid in the proportion of about 0.7–1.0 mole of 20–50% nitric acid per mole of mucochloric acid, at a temperature of about 80–105° C., for about 2–5 hours, recycling evolved oxides of nitrogen, separating all the water and unreacted nitric acid from the dichloromaleic acid, and dehydrating the dichloromaleic acid to dichloromaleic anhydride.

13. A method of producing dichloromaleic anhydride, which comprises forming dichloromaleic acid by reacting mucochloric acid with aqueous nitric acid containing about 20–70% nitric acid, at a temperature of about 80–105° C., separating excess water and unreacted nitric acid from the dichloromaleic acid, and dehydrating the dichloromaleic acid to dichloromaleic anhydride.

14. In the preparation of dichloromaleic anhydride by formation of dichloromaleic acid and dehydration thereof, the step which comprises reacting mucochloric acid with aqueous nitric acid containing about 20–70% nitric acid at a temperature of about 80–105° C., and separating water and unreacted nitric acid from the dichloromaleic acid formed.

15. The method of claim 14, wherein the proportion of nitric acid to mucochloric acid is about 0.7–1.8 moles of nitric acid per mole of mucochloric acid.

16. In the preparation of dichloromaleic anhydride by formation of dichloromaleic acid and dehydration thereof, the step which comprises reacting mucochloric acid with aqueous nitric acid in the proportion of about 0.7–1.0 mole of 20–50% nitric acid per mole of mucochloride acid at a temperature of about 80–105° C., recycling evolved oxides of nitrogen, and separating water and unreacted nitric acid from the dichloromaleic acid produced.

References Cited in the file of this patent

UNITED STATES PATENTS

| | | |
|---|---|---|
| 2,298,387 | Kenyon | Oct. 13, 1942 |
| 2,385,518 | Isham | Sept. 25, 1945 |
| 2,389,950 | Bremner | Nov. 27, 1945 |
| 2,771,482 | Brown | Nov. 20, 1956 |

FOREIGN PATENTS

| | | |
|---|---|---|
| 473,262 | Germany | Mar. 14, 1929 |

OTHER REFERENCES

Hill et al.: Proc. Am. Acad. Arts Sci. 24, 340–341 (1889).

Hendrixson: Proc. Am. Acad. Arts Sci. 24, 376–377 (1889).

Hill: Berichte, vol. 13, pages 736–739 (1880).

Salmony et al.: Berichte 38: 2580–2601 (1905).

Hill et al.: Berichte 16: 2395–96 (1886).